United States Patent
Sova

[19]

[11] Patent Number: 6,095,366
[45] Date of Patent: Aug. 1, 2000

[54] GLOBAL WARMING COVER

[76] Inventor: Jacob William Sova, 450 Victor Way, Wyckoff, N.J. 07481

[21] Appl. No.: 09/042,676

[22] Filed: Mar. 13, 1998

[51] Int. Cl.[7] .............................. A47G 19/12; B65D 51/16
[52] U.S. Cl. ...................... 220/366.1; 220/231; 220/287; 220/573.1
[58] Field of Search ................................ 220/366.1, 287, 220/573.1, 573.2, 573.3, 213, 231, 254, 796, 360, 361, 367.1, 912

[56] References Cited

U.S. PATENT DOCUMENTS

| | | | |
|---|---|---|---|
| 1,926,240 | 9/1933 | Maas | 220/366.1 |
| 2,606,686 | 8/1952 | Barranco | 220/231 |
| 3,028,039 | 4/1962 | Clark | 220/366.1 |
| 3,362,566 | 1/1968 | Hanania | 220/231 |
| 3,794,090 | 2/1974 | Commisso | 220/366.1 |
| 3,927,820 | 12/1975 | Wagner et al. | 220/796 |
| 4,252,268 | 2/1981 | Haire | 220/366.1 |
| 5,156,290 | 10/1992 | Rodrigues | 220/366.1 |
| 5,377,859 | 1/1995 | Hacker | 220/287 |
| 5,555,994 | 9/1996 | Chen | 220/287 |
| 5,597,088 | 1/1997 | Fingerle et al. | 220/287 |
| 5,613,618 | 3/1997 | Raoult | 220/287 |
| 5,686,127 | 11/1997 | Stockley, III et al. | 220/366.1 |
| 5,715,743 | 2/1998 | Goddard | 220/912 |

*Primary Examiner*—Allan N. Shoap
*Assistant Examiner*—Niki M. Eloshway

[57] ABSTRACT

The global warming cover is a general purpose cooking utensil cover which is designed to capture and reuse radiated heat. The cover has an outer curved flange which overhangs the side of the pot, and reflects, recycles, reutilizes and directs heat back toward the utensil during everyday cooking processes. The cover of the present invention is a one-size-fits-all type since the amount of overhang over the side of the pot or vessel has little effect on its efficiency in recirculating the heat. The global warming cover of the present invention may be used on the consumers' present pots or vessels, regardless of diameter differences.

2 Claims, 3 Drawing Sheets

ENLARGED CROSS SECTION

GLOBAL WARMING COVER

The present invention pertains to cooking utensils which serve as vessels or pots for heating solids and liquids and have the means to accumulate heat from various areas.

The cover of the present invention, having an outer curved flange flaring inward, is designed to trap and recycle heat ordinarily lost under and around cooking utensils. The flange of the cover, overhanging the side of the pot, reflects, recycles, reutilizes and directs heat back toward the utensil during everyday cooking processes and, thus, maintaining quicker heat uniformity in the pots' contents. This invention generates savings by reducing the amount of time and heating energy required, no matter what mode (gas, electric, coal, oil, wood or campfire) of cooking is used. Also less pollutants are produced and released into the atmosphere which, thereby, reduces our present global warming problem.

BACKGROUND OF THE INVENTION

The closest prior art to the present invention disclosure herein is primarily in the field or steam-type cooking utensils and deep-fry type cooking utensils.

In particular, Anderson, U.S. Pat. No. 2,154,391, discloses a deep fryer kettle enclosed within a housing. Lewis, U.S. Pat. No. 861,297, discloses a roasting pan with an outer supporting flange to raise the bottom of the pan off the source of heat. Anetsberger, U.S. Pat. No. 2,061,533, discloses a deep fryer encased in a housing. Hielsen, U.S. Pat. No. 2,431,193, discloses a kettle enclosed within a larger housing to trap heat around the sides of the kettle. Sova, U.S. Pat. No. 3,982,479, discloses special long walls around the kettle or cover which entails purchasing a complete new set of cookware.

The basic problem with the prior art devices disclosed above and others similar to them is that they are primarily special purpose cooking utensils. Their specific design and construction is limited by the application in which they serve. Also, the diameter of the covers and pots or vessels must match exactly.

The present invention disclosure pertains to a general purpose cooking utensil cover which is designed to capture and reuse radiated heat. Ordinarily, this heat would be wasted but the cover of the present invention would reutilize that heat to cook more effectively and efficiently no matter what type of heating energy is used. Also, the cover of the present invention is a one-size-fits-all type since the amount of overhang over the side of the pot or vessel has little effect on its efficiency in recirculating the heat. The cover of the present invention may be used on the consumers' present pots or vessels, regardless of diameter differences.

BRIEF SUMMARY OF THE PRESENT INVENTION

This invention pertains to general cooking utensils, variously referred to as pots and pans, and specifically to ones when heated, which allow the heat to normally escape around the sides of the cooking utensil. The novel structures and features of my invention are:

1 The heat recycling feature and the adaptability to be used on different diameter and types of pots or vessels, 2 The raised ribs or areas on the inside of the cover to allow automatic venting for recycling the heat from within the pot as well as the heating source, and 3 The one-piece knob which also functions as a part of manual venting with the added safety feature of having only one vent hole on the cover.

DETAILED DESCRIPTION OF THE PRESENT INVENTION

Figure 1:
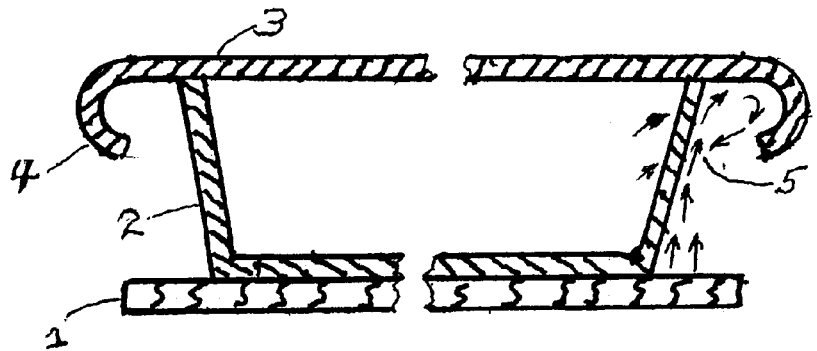
FIG. 1 is a vertical sectional view illustrating a typical cooking vessel 2 embodying the heat recycling principle of my invention having the curved flange 4 on a cover 3. Also shown is the heat source 1 and the direction in which the heat 5 is recirculated, as proven in experiments.

Referring again to the drawings and in particular to FIG. 1, a side perspective view of the preferred embodiment of the invention is shown. The reference numeral 5 refers generally to the principle of heat recycling and energy saving feature which is that the cover's curved flange 4 redirects escaping heat toward the vessel 2. A very important fact is that this cover 3 is large enough to accommodate vessels 2 having various sizes and diameters.

Figure 2:
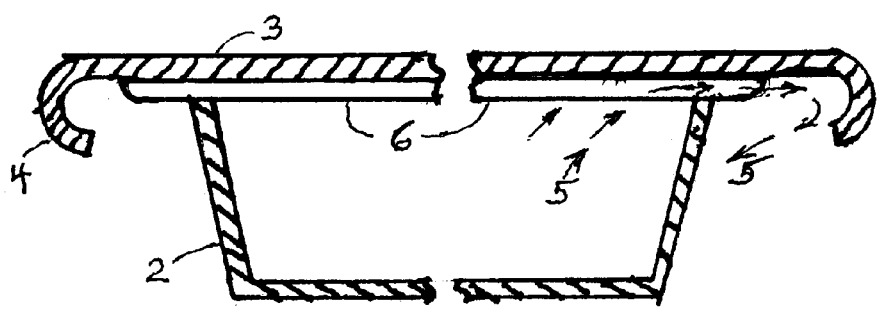
FIG. 2 is a vertical sectional view illustrating how the adding of ribs 6 beneath the inside of the cover 3 raises the cover so that internal heat 5 can escape between the vessel 2 and its contents, and be recycled.
Figure 3:
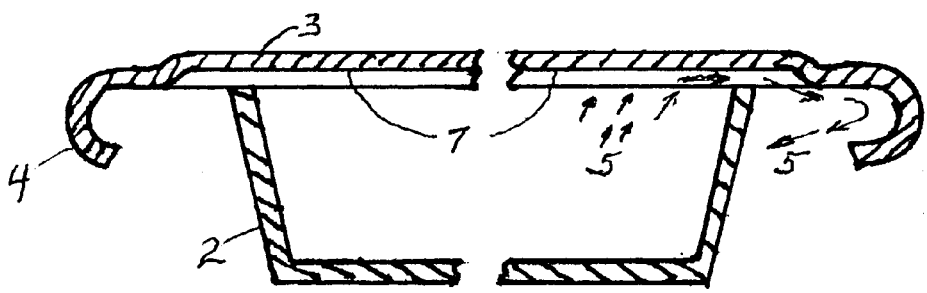
FIG. 3 is a vertical sectional view illustrating an alternate embodiment by having raised areas 7 in the inside of the cover 3 which allows the internal heat 5 to escape between the vessel 2 and the cover 3. The principle of heat recycling is the same as FIG. 2.

Referring now to FIGS. 2 and 3, both covers 3 show the space created underneath them for automatic venting. FIG. 2 has ribs 6 to create space between the cover 3 and the vessel, and in FIG. 3 there is a raised area 7 to achieve the automatic venting which allows excessive internal heat to escape and be recirculated against the wall of the vessel or pot 2. This maintains a uniformity of temperature throughout the contents of the vessel or pot 2, and it also prevents hot spots, burning and uneven temperatures.

Figure 4:
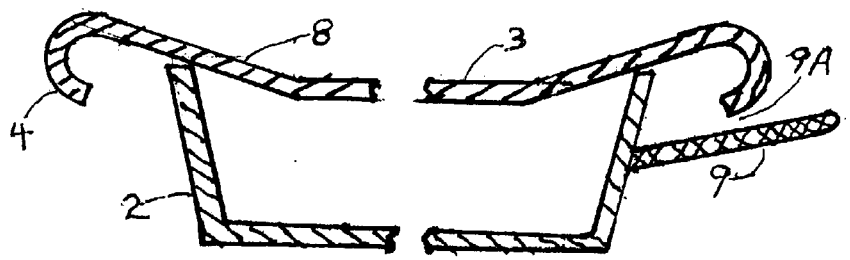
FIG. 4 is a vertical sectional view illustrating a cover 3 having a curvature or angular shape 8 which self-centers the cover 3 onto the vessel 2 and provides handle clearance 9A between the cover 3 and handle 9. Since no automatic venting is shown on this cover 3, its shape provides and airtight fit on cooking utensils 2 of varying sizes.
Figure 5:
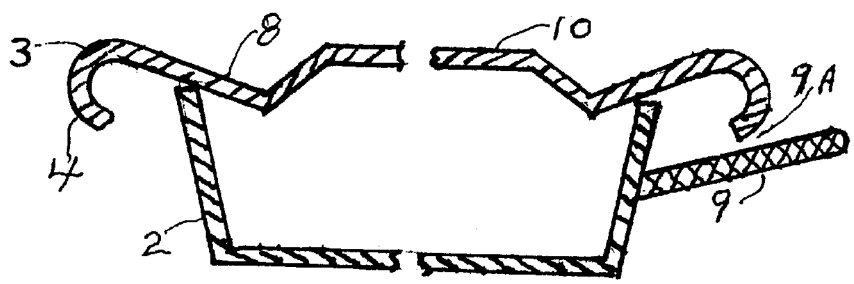
FIG. 5 is a vertical view (sectional) illustrating similar self-centering 8 and handle clearance 9A principles of FIG. 4, but in addition, has a raised section 10 in the center of the cover 3 for greater capacity in the vessel 2. Since no automatic venting is shown on this cover 3, its shape provides an airtight lit on cooking utensils 2 of varying sizes.

FIGS. 4 and 5 show covers 3 having curvatures or angles 8 to self-locate in a vessel 2 with a secondary purpose of providing clearance 9A between the handle 9 and the cover 3. This feature ensures a proper fit with a consumer's present cookware. In FIG. 5, the cover 3 has a dome shape 10 for the purpose of increasing the capacity of the vessel or pot 2.

Figure 6:
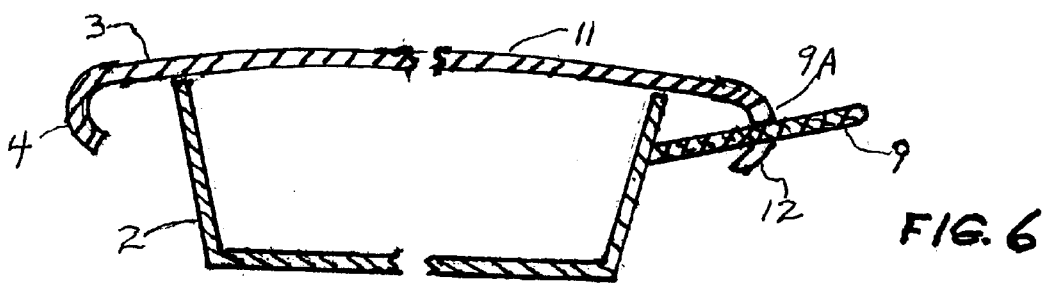
FIG. 6 is a vertical sectional view illustrating a cover 3 with a rounded or dome shape 11. To provide clearance for the handle 9, a portion 12 of the cover 3 and its flange 4 is removed, notched out or reformed (flattened).

FIG. 6 shows a rounded or curved dome shape 11 for self-locating on a vessel or pot 2. Due to the shape of the cover 3 and depending on the location of the handle 9, an alternate method may be required for achieving handle clearance 9A. Therefore, to prevent inference between the cover 3 and the handle 9, a small section 12 of the curved cover flange 4 is notched out or removed. Another method to provide a clearance 9A is to flatten a small section in the cover flange 4.

Figure 7:
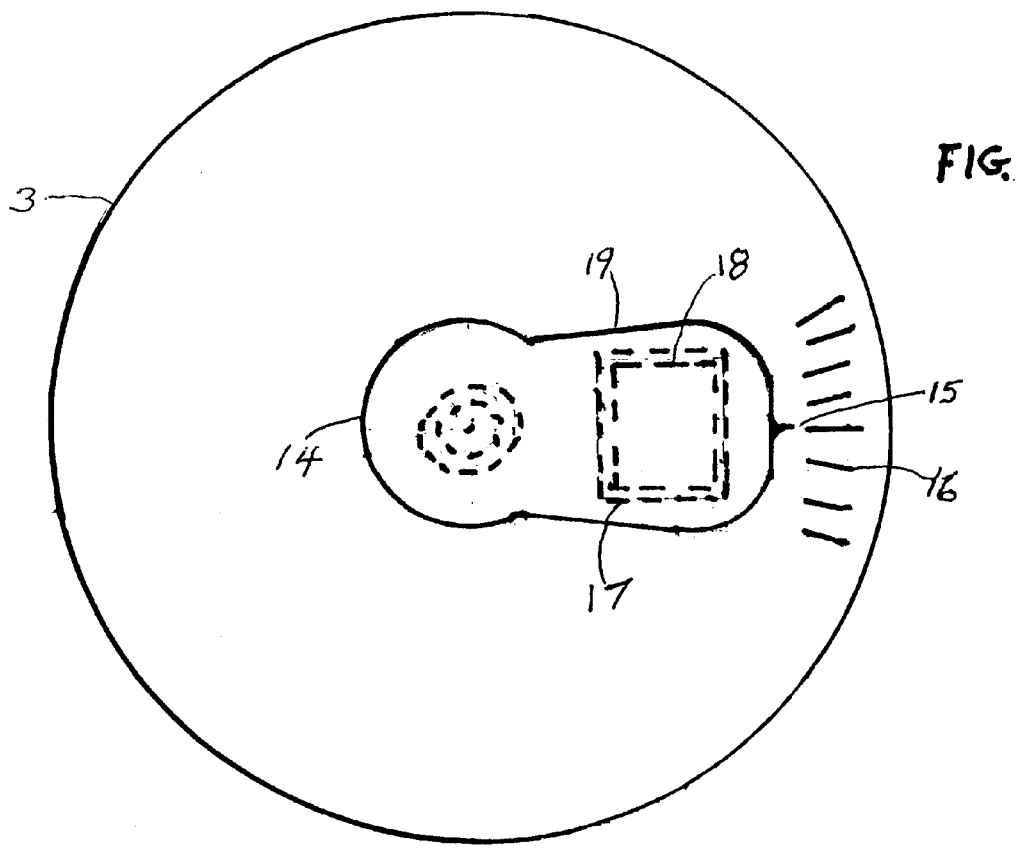
FIG. 7 is a top view illustrating the cover 3, one piece knob 14 and its manual venting apparatus. By raising the knob 14, the pointer 15 can be moved to any line 16 and this will open or close the vent opening 17 in the cover 3. The cover vent opening 17 is totally closed when the protrusion 18 of the knob extension 19 is seated in opening 17.
Figure 8:
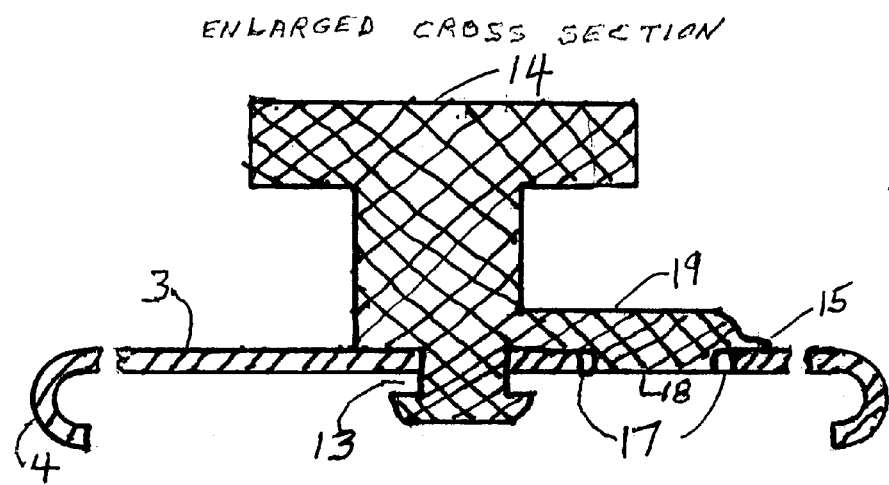
FIG. 8 is a vertical sectional view of the invention shown in FIG. 7. It shows the one piece knob 14 and its extension 19 whose protrusion 18 is seated in the cover vent opening 17. This is the closed position. To rotate the knob 14 it must be raised and space 13 is provided for that purpose.

FIGS. 7 and 8 illustrate the top and sectional views of the global warming covers 3 operating manual venting system. To turn the one piece knob 14, it must be raised and this is allowed by the space 13. FIGS. 7 and 8 show the knob 14 in a position closing the cover vent opening 17 completely by the protrusion 18 of the knob flange 19. By raising and rotating the knob 14, the pointer 15 will indicate how much of the vent opening 17 is exposed. The vent opening is only on one side for safety reasons, since a hand would be scalded if there were multiple openings.

I claim:

1. A cover and container therefore, for use on a heated surface, comprising:

a container having a bottom wall and a sidewall extending upwardly from a periphery of said bottom wall, said sidewall ending in an upwardly facing edge;

a removable cover having a central portion, a first skirt, a conical portion and a curved rim, said first skirt extends downwardly from an outer periphery of said central portion, said conical portion extends upwardly and radially outwardly from said first skirt and said curved rim extends radially outwardly from an outer periphery of said conical portion, said curved rim having a free end and extending approximately 180 degrees so that said free end extends radially inwardly towards said container;

wherein said conical portion engages said upwardly facing edge of said container and seals the container when said cover is placed thereon, said conical portion directing heat from said heated surface outwardly towards said curved rim and said curved rim directing said heat from said heated surface inwardly toward said container sidewall when said container is placed on said heated surface and said cover is placed on said upwardly facing edge of said container.

2. The cover and container of claim 1 further comprising a vent opening in said central portion of said removable cover, and a vent opening cover, said vent opening cover being rotatably mounted on said central portion of said removable cover and having a knob extending from an upper surface of said vent opening cover and a projection extending from a lower surface of said vent opening cover, said projection being insertable into said vent opening to seal said opening.

\* \* \* \* \*